United States Patent [19]

Kimura

[11] 4,393,409
[45] Jul. 12, 1983

[54] FOCUSING APPARATUS FOR IMAGE PICKUP DEVICE

[75] Inventor: Kenji Kimura, Tachikawa, Japan

[73] Assignee: Olympus Optical Co., Ltd., Tokyo, Japan

[21] Appl. No.: 262,917

[22] Filed: May 12, 1981

[30] Foreign Application Priority Data

May 30, 1980 [JP] Japan .................................. 55-71476

[51] Int. Cl.³ ............................................. H04N 5/26
[52] U.S. Cl. ................................................... 358/227
[58] Field of Search ......................................... 358/227

[56] References Cited

U.S. PATENT DOCUMENTS 3,283,231 11/1966 Askew ................................. 358/227
3,400,212 9/1968 Plummer ............................. 358/227

FOREIGN PATENT DOCUMENTS 54-119232 9/1979 Japan .

Primary Examiner—Richard Murray
Attorney, Agent, or Firm—Frishauf, Holtz, Goodman & Woodward

[57] ABSTRACT

A focusing apparatus for an image pickup device includes a focusing mechanism for carrying out focus adjustment for the image pickup; a zooming mechanism for carrying out zoom adjustment for the image pickup; a detector for furnishing zoom data corresponding to the extent of zoom adjustment carried out by the zooming mechanism; and a driver for actuating the focusing mechanism in accordance with the zoom data.

The focusing mechanism, zooming mechanism, detector and driver jointly comprise a servo loop for carrying out the prescribed adjustment of the focus in accordance with the extent of zoom adjustment carried out by the zooming mechanism.

12 Claims, 5 Drawing Figures

FOCUSING APPARATUS FOR IMAGE PICKUP DEVICE

BACKGROUND OF THE INVENTION

This invention relates to an image pickup device of a television camera provided with a zooming function, wherein the focus is adjusted interlockingly with the zooming operation.

With a popular simple television camera, the lenses constituting a lens system are reduced in size, and their arrangement is simplified to decrease the production cost of said camera. It is often impossible to adapt an elaborate lens mechanism for such popular television camera. With this type of television camera, it is necessary to adjust the focus together with a zooming operation in order to assure a good focus at all times. In the case of a portable television camera, the operator has to hold the body of the camera with one hand and carry out a zooming operation with the other hand. In such case, it is almost impossible to adjust the focus accurately at the same time as the zooming operation. The reason for this is that an extremely high skill is demanded of the operator in order to attempt zooming with a good focus retained.

SUMMARY OF THE INVENTION

This invention has been accomplished in view of the above-mentioned circumstances, and is intended to provide an image pickup device wherein the focus is automatically adjusted interlockingly with zooming.

To attain the above-mentioned object, this invention provides an image pickup device, wherein servo control of the focus is effected by detecting data on the zooming operation, thereby enabling the operator to carry out zooming with a good focus assured without manually adjusting the focus.

DESCRIPTION OF THE PREFERRED EMBODIMENT

Figure 1:
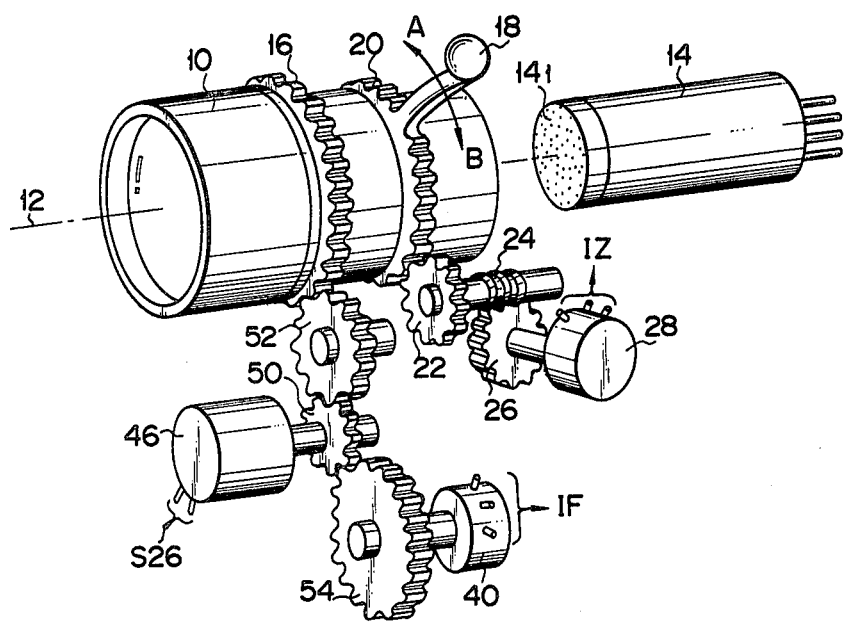
FIG. 1 is an oblique view of a zooming and focus-adjusting mechanism of an image pickup device embodying this invention.

Throughout the drawings, the same parts are denoted by the same reference numerals to simplify description. FIG. 1 shows a zooming and focusing mechanism of, for example, a television camera. Disposed on the optical axis 12 of a lens assembly 10 is the target plane $14_1$ of, for example, a vidicon (or CCD image pickup element) 14. The lens assembly 10 is provided with a mechanism for adjusting the focus on the target plane $14_1$ and zooming mechanism. A detailed description of these mechanisms is omitted which is already disclosed in the Japanese patent publication No. 6871/67. The focus adjusting or focusing means set in the lens assembly 10 is operated in accordance with the extent of the rotation of the focus gear 16 surrounding the outer peripheral wall of the lens assembly 10. The zooming mechanism of the lens assembly 10 is actuated by rotating an operation knob 18. This knob 18 can take any position falling within an angle of, for example, 90°. Zooming is carried out to an extent corresponding to the position of the knob 18. The knob 18 coupled to the focusing means by means of the lens assembly 10 constitutes part of the aforesaid zooming means.

The outer peripheral wall of the lens assembly 10 is surrounded by a zoom gear 20 integrally formed with the knob 18. The zoom gear 20 is connected to a worm gear 24 by means of a pinion 22. The worm gear 24 is coupled to the shaft of a potentiometer 28 by means of a pinion 26. Where the knob 18 is rotated in a direction indicated by an arrow A or B, then the shaft of the potentiometer 28 is turned clockwise or counterclockwise by means of a gear system consisting of the gears 20, 22, 24, 26. In other words, data denoting the position of the rotated knob 18 is sent forth from the potentiometer 28. This potentiometer 28 constitutes first detection means for supplying zoom data IZ corresponding to the extent to which zooming is adjusted.

Figure 2:
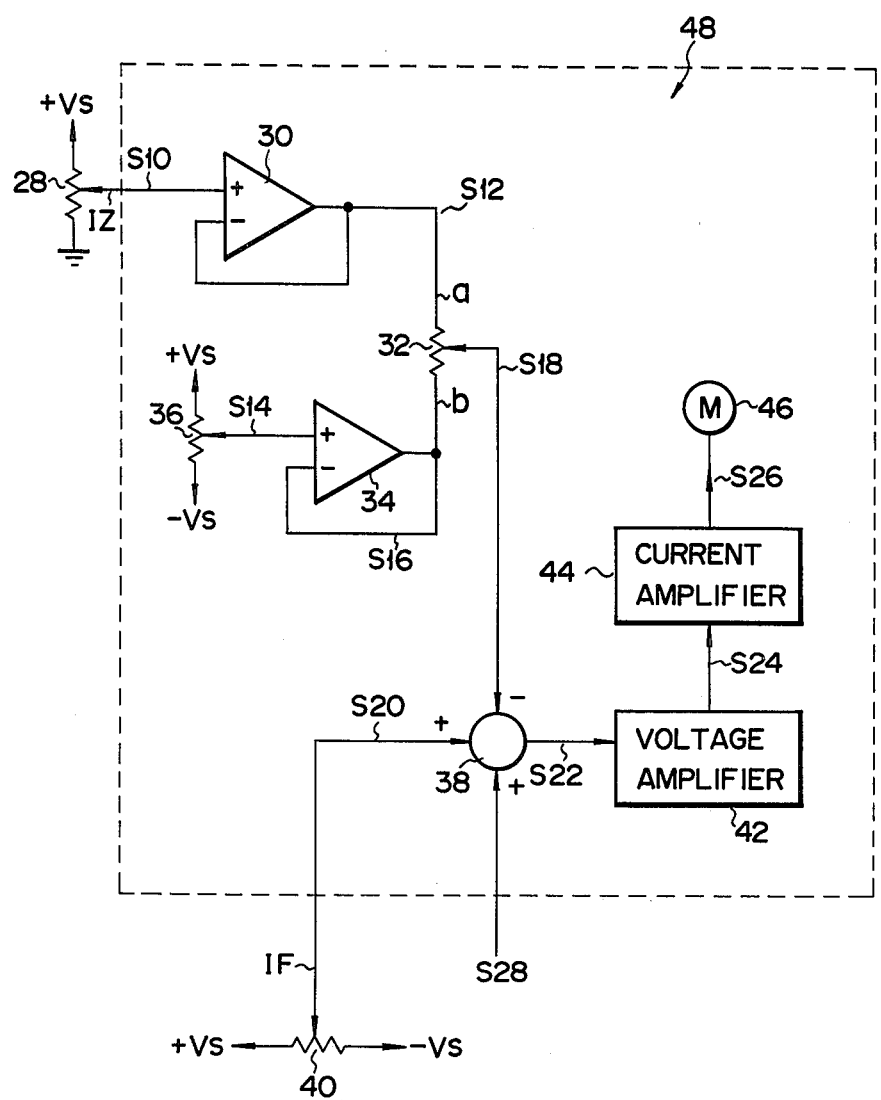
FIG. 2 shows the arrangement of an electric circuit constituting the servo loop of the image pickup device for joint use with said mechanism.

FIG. 2 shows an electric system used with the mechanical system of FIG. 1. One end of the potentiometer 28 is grounded, and the other end thereof is impressed with a positive voltage +Vs. A signal S10 corresponding to the zoom data IZ is issued from a slider received in the potentiometer 28. The signal S10 has a potential corresponding to the position of the slider or the position of the rotated knob 18. The signal S10 is impedance-converted into a signal S12 by means of a non-inverted type buffer amplifier 30. The converted signal S12 is supplied to one end a of a variable resistor 32. The other end b of the variable resistor 32 is connected to the output terminal of a non-inverted type buffer amplifier 34. The non-inverted input terminal of the buffer amplifier 34 is connected to the slider of a variable resistor 36, both ends of which are respectively impressed with positive voltage +Vs and negative voltage −Vs. A signal S14 issued from the slider of the variable resistor 36 is impedance-converted into a signal S16 by means of the buffer amplifier 34. The potential of the signal S16 varies with the position of the slider of the variable resistor 36. The signals S12, S16 respectively supplied to both ends a, b of the variable resistor 32 are sent forth from the corresponding buffer amplifiers 30, 34 with a sufficiently low impedance. Where, therefore, the positive voltage +Vs and negative voltage −Vs are respectively set at a prescribed level, then the potential of the signal S12 is determined only by the position of the slider of the potentiometer 28. The potential of the signal S16 is defined only by the position of the slider of the variable resistor 36.

The slider of the variable resistor 32 issues a signal S18 whose potential varies with the position of said slider and the potentials of the signals S12, S16. The signal S18 is supplied to a subtracter (composer) 38, which receives a signal S20 from the slider of a potentiometer 40. Both ends of this potentiometer 40 are impressed with the positive voltage +Vs and negative voltage −Vs. The signal S20 is used as focus data IF corresponding to the extent to which the focus is adjusted by the focus means. The subtracter 38 issues a signal S22 corresponding to a difference between the potentials of the signals S18, S20. The signal S22 has its voltage amplified by a voltage amplifier 42 and is converted into a signal S24 having a proper voltage level. This signal S24 is further converted into a signal S26 by means of a current amplifier 44 having a sufficient current-supplying capacity. The signal S26 is conducted to a D.C. reversible motor 46.

The above-mentioned constituent elements 30, 32, 34, 36, 38, 42, 44, 46 jointly constitute drive means 48 for actuating the focusing means in accordance with zoom data IZ. The motor 46 is driven in a prescribed direction to a predetermined extent in accordance with the slider position of the potentiometer 28 varying with the zoom data IZ. The rotation of the motor 46 is transmitted, as shown in FIG. 1, to the focus gear 16 by means of pinions 50, 52 and also to the shaft of the potentiometer 40 by means of pinions 50, 54. Where the slider of the potentiometer 28 has its position changed by the operation of the knob 18, then the motor 46 is rotated to an extent corresponding to said change in the slider position, causing the focus gear 16 to be rotated to a prescribed extent. The rotation of the focus gear 16 is transmitted to the potentiometer 40 by means of the pinions 52, 50, 54. In other words, a closed servo loop is formed by the focusing means (not shown) provided in the lens assembly 10 in a state coupled to the focus gear 16, zoom means (not shown) set in the lens assembly 10 in a state coupled to the zoom gear 20, first detecting means constituted by the potentiometer 28 and the drive means 48 of FIG. 2. Where the knob 18 is operated, and the zooming extent is changed by the action of the servo loop, then a focus is automatically adjusted in accordance with said change in the zooming extent.

The control target of the servo loop may be defined manually or by any other means. With the foregoing embodiment, however, the control target is denoted by the focus data IF supplied from the slider of the potentiometer 40, that is, the potential of the signal S20. In other words, the servo loop of the image pickup device of FIGS. 1 and 2 is so actuated as to set the voltage of the signal S22 at a minimum level. Namely, servo control is carried out to cause the position of the slider of the potentiometer 28 and the position of the slider of the potentiometer 40 to be always set at a prescribed relationship. The potentiometer 40 constitutes second detection means for furnishing focus data IF corresponding to the extent to which the focus is adjusted by the focusing means.

The image pickup device of FIGS. 1 and 2 is operated as follows. First, the knob 18 is fully rotated in a direction indicated by the arrow B to take such a position as allows for minimum zooming. In this case, the gears, 20, 22, 24, 26 are designed to bear such a gear ratio (a ratio which the numbers of the teeth of said gears bear to each other) as causes the slider of the potentiometer 28 to be brought toward the ground. Namely, where zooming is carried out to a minimum extent, the potential of the signal S10 is reduced to zero. The variable resistor 32 is so actuated as to cause its slider to be brought to the b side (FIG. 2). In this case, the signals S16, S18 have the same potential. Provided, therefore, the positive and negative voltages ±Vs are chosen to have a fixed level, the voltage of the signal S18 supplied to the subtracter 38 varies only with the position of the variable resistor 36. In this case, the servo loop is shut off, causing the motor 46 to be rotated to an extent corresponding to the position of the slider of the variable resistor 36. An optical image picked up on the target plane $14_1$ of the vidicon 14 is monitored, for example, by the CRT of a view finder (not shown). The focus is adjusted by the variable resistor 36 to assure best resolution. The slider of the potentiometer 40 is moved with the rotation of the motor 46. Since, however, the servo loop is shut off, the focus is smoothly adjusted.

Thereafter, the knob 18 is fully rotated in a direction indicated by the arrow A to take such a position as allows for maximum zooming.

In this case, the signal S10 issued from the potentiometer 28 is chosen to have, for example, a potential of +Vs (however, said signal S10 need not have the potential +Vs). The above-mentioned maximum zooming causes the focus to be displaced from an optimum point. Therefore, the operation of the variable resistor 32 is so controlled as to assure best resolution. Where the slider of the variable resistor 32 is made to slowly slide from the b side to the a side (FIG. 2), then the best focus can be obtained. In this case the servo loop is actuated. If necessary, it is possible to change the position of the knob 18 several times by rotating the knob 18 in the directions of the arrows A and B, thereby repeating the control of the operation of the variable resistors 36, 32. The above-mentioned focus adjustment always assures best resolution regardless of the position of the knob 18, namely, the extent of zooming. Since the extent of zooming and the displacement of the focus have a substantially linear relationship, the servo loop is operated under a stable condition even with respect to wide range zooming. This event is greatly assisted by the fact that since the rotation of the motor 46 is linearly transmitted to the focusing means and potentiometer 40, the control target of the servo loop can be linearly varied with the extent to which the focus is adjusted by the focusing means.

It is to be understood that the embodiment of this invention described with reference to the accompanying drawings does not restrict the invention in any way. Obviously, the invention can be practiced with various replacements, additions and modifications within the scope, spirit and claims of the invention. For instance, the potentiometers 28, 40 respectively constituting the first and second detection means may be replaced by a photointerrupter, a kind of photoelectric converter, (FIGS. 3 and 4) which causes a penetrating light to be varied in amount with the position of the rotated knob 18.

Figure 3A:
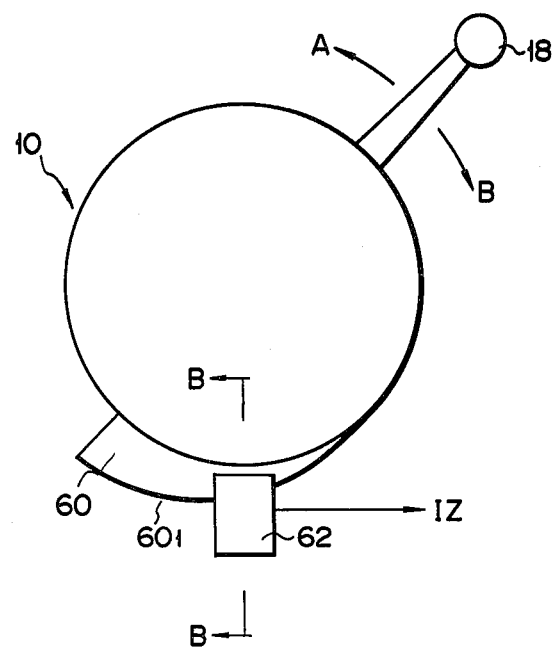
FIG. 3A represents the case where the potentiometer 28 of FIG. 1 is replaced by a photosensor provided with a photointerrupter.

Referring to FIG. 3A, a screen 60 rotated with the knob 18 is provided on the outer peripheral wall of the lens assembly 10. The screen 60 traverses the light path of a photointerrupter 62. The screen 60 comprises an end portion $60_1$ whose edge is shaped like an involute curve. Where, therefore, the screen 60 is rotated with the rotation of the knob 18, then the screen 60 shuts off light passing through the photointerrupter 62 in different degrees.

Figure 3B:
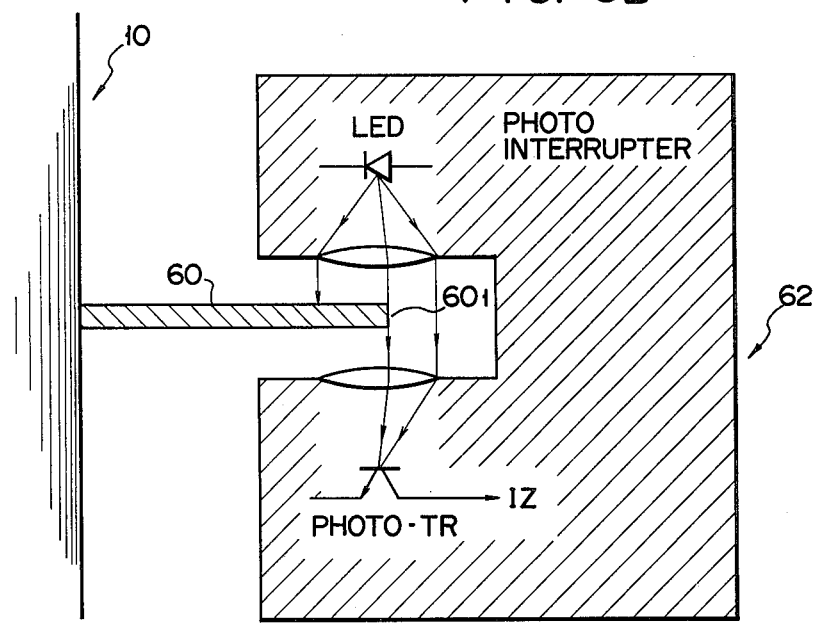
FIG. 3B is a cross sectional view on line B—B of FIG. 3A.

FIG. 3B is a sectional view on line B—B of FIG. 3A. The photointerrupter 62 comprises a light-emitting diode (LED) as a light source and a phototransistor as a photosensor. A light flux running from the LED to the phototransistor is partly shut off by the screen 60. The extent to which the light flux is shut off varies with the position of the rotated knob 18, that is, the relative positions of the screen 60 and photointerrupter 62. Therefore, the collector current IZ (zoom data) of the phototransistor 62 varies with the position of the rotated knob 18.

Figure 4:
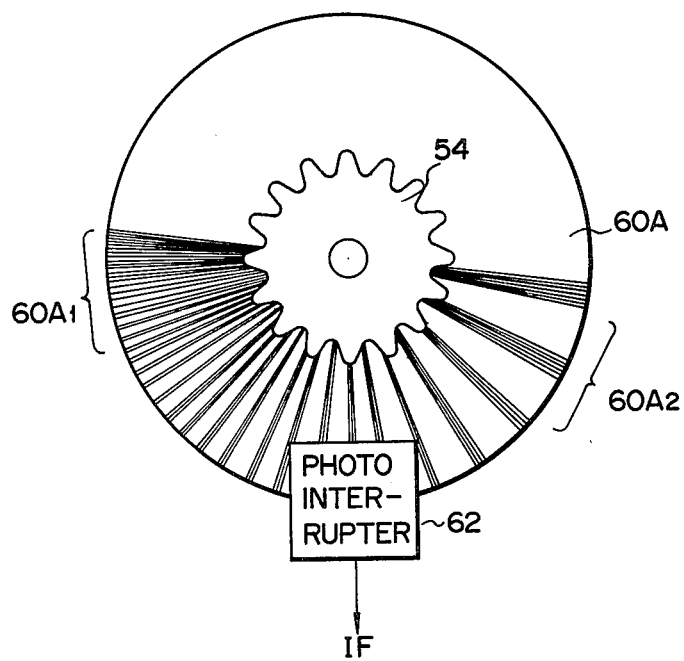
FIG. 4 represents the case where the potentiometer 40 of FIG. 1 is replaced by a photosensor provided with a photointerrupter.

FIG. 4 indicates the case where the potentiometer 40 is replaced by the photointerrupter 62. In FIG. 4, the involute screen 60 of FIG. 3A is replaced by a light-permeable screen 60A which changes the average amount of light passing therethrough. The black portions of the screen 60A are not permeable to light at all. The white portions allow for the passage of light. Therefore, the darker area $60A_1$ of the screen 60A is less permeable to light (the average amount of a penetrating light is smaller). In contrast, the brighter area $60A_2$ of the screen 60A is more permeable to light (the average amount of a penetrating light is larger). Thus, the photointerrupter 62 sends forth focus data IF corresponding to the angle through which the pinion 54 is rotated.

It is possible to impress both ends of the potentiometer 28 with positive and negative voltages $\pm Vs$, instead of grounding one end thereof. For elevation of the responsiveness and stability of the servo loop, it is possible to add a phase compensation circuit to, for example, the voltage amplifier 42. The motor 46 may be formed of the stepping type, instead of the D.C. type. This invention is applicable to the ordinary single exposure camera or movie camera. Further, the focusing apparatus of this invention may be used with the devices of the following patent applications previously filed by the same patent assignee as that of the present patent application.

(1) Iris Servo Apparatus (Japanese patent application No. 56,867/80)

(2) Focus Control Apparatus (Japanese patent application No. 58,399/80)

What is claimed is:

1. A focusing apparatus for an image pickup device comprising:
   (a) an image pickup;
   (b) focusing means for carrying out focus adjustment for said image pickup;
   (c) zooming means coupled to said focusing means for carrying out zoom adjustment for said image pickup;
   (d) first detection means coupled to said zooming means for supplying zoom data corresponding to the extent of zoom adjustment carried out by said zooming means;
   (e) drive means for actuating said focusing means in accordance with said zoom data;
   said focusing means, zooming means, first detection means and drive means jointly comprising a servo loop for carrying out a prescribed adjustment of the focus in accordance with the extent of zoom adjustment carried out by said zooming means; and
   (f) second detection means coupled to said focusing means for providing focus data corresponding to the extent of focus adjustment carried out by said focusing means, said focus data being used as a control target of said servo loop;
   said second detection means including a screen which is connected to said focusing means and whose light transmittance varies with the extent of focus adjustment, and a photoelectric converter coupled to said screen for issuing focus data corresponding to the amount of light transmitted through said screen.

2. A focusing apparatus according to claim 1, wherein said first detection means includes a potentiometer which is coupled to said zooming means and is actuated in accordance with the extent of zoom adjustment.

3. A focusing apparatus according to claim 1, wherein said first detection means includes a screen which is connected to said zooming means and whose light transmittance varies with the extent of zoom adjustment, and a photoelectric converter coupled to said screen for issuing zoom data corresponding to the amount of light transmitted through said screen.

4. A focusing apparatus for an image pickup device comprising:
   (a) an image pickup;
   (b) focusing means for carrying out focus adjustment for said image pickup;
   (c) zooming means coupled to said focusing means for carrying out zoom adjustment for said image pickup;
   (d) first detection means coupled to said zooming means for sending forth a first signal indicating the extent of zooming carried out by said zooming means;
   (e) conversion means coupled to said first detection means for converting said first signal into a second signal whose D.C. potential varies with the set condition of said conversion means;
   (f) second detection means coupled to said focusing means for issuing a third signal indicating the extent of focus adjustment carried out by said focusing means;
   (g) composing means coupled to said conversion means and to said second detection means for composing said second signal and third signal into a fourth signal; and
   (h) amplifier means coupled to said composing means for driving said focusing means in accordance with the magnitude of said fourth signal.

5. A focusing apparatus according to claim 4, comprising a source of a fifth signal whose magnitude changes the degree of focus adjustment carried out by said focusing means, and wherein said composing means combines together said second signal, said third signal and said fifth signal.

6. A focusing apparatus according to claim 4, wherein said second detection means includes a potentiometer which is coupled to said focusing means and is actuated in accordance with the extent of focus adjustment.

7. A focusing apparatus according to claim 3, wherein said second detection means includes a screen which is connected to said focusing means and whose light transmittance varies with the extent of focus adjustment, and a photoelectric converter which is coupled to said screen for issuing said third signal corresponding to the amount of light transmitted through said screen.

8. A focusing apparatus according to any one of claims 4, 5, 6 or 7, wherein said first detection means includes a potentiometer which is coupled to said zooming means and is actuated in accordance with the extent of zoom adjustment.

9. A focusing apparatus according to any one of claims 4, 5, 6 or 7, wherein said first detection means includes a screen which is connected to said zooming means and whose light transmittance varies with the extent of zoom adjustment, and a photoelectric converter coupled to said screen for issuing said first signal corresponding to the amount of ligh transmitted through said screen.

10. A focusing apparatus for an image pickup device comprising:

(a) an image pickup;
(b) focusing means for carrying out focus adjustment for said image pickup;
(c) zooming means coupled to said focusing means for carrying out zoom adjustment for said image pickup;
(d) first detection means coupled to said zooming means for supplying zoom data corresponding to the extent of zoom adjustment carried out by said zooming means, said first detection means including a screen which is connected to said zooming means and whose light transmittance varies with the extent of zoom adjustment, and a photoelectric converter coupled to said screen for issuing said zoom data corresponding to the amount of light transmitted through said screen; and
(e) drive means for actuating said focusing means in accordance with said zoom data;
said focusing means, zooming means, first detection means and drive means jointly comprising a servo loop for carrying out a prescribed adjustment of the focus in accordance with the extent of zoom adjustment carried out by said zooming means.

11. A focusing apparatus according to claim 10, further comprising:
second detection means coupled to said focusing means for providing focus data corresponding to the extent of focus adjustment carried out by said focusing means, said focus data being used as a control target of said servo loop.

12. A focusing apparatus according to claim 11, wherein said second detection means includes a potentiometer which is coupled to said focusing means and is actuated in accordance with the extent of focus adjustment.

* * * * *

UNITED STATES PATENT AND TRADEMARK OFFICE
CERTIFICATE OF CORRECTION

PATENT NO. : 4,393,409
DATED : July 12, 1983
INVENTOR(S) : Kenji KIMURA

It is certified that error appears in the above-identified patent and that said Letters Patent is hereby corrected as shown below:

COLUMN 6 (claim 7), line 46, change "claim 3" to --claim 4--.

Signed and Sealed this

Twenty-second Day of November 1983

[SEAL]

Attest:

GERALD J. MOSSINGHOFF

Attesting Officer  Commissioner of Patents and Trademarks